United States Patent [19]

Le Noane et al.

[11] 4,408,828
[45] Oct. 11, 1983

[54] OPTICAL FIBRE SUBMARINE CABLE

[76] Inventors: Georges E. Le Noane, Kerrougant Bras, Tregastel, France, 22730; Bernard G. Nonclercq, Kergomar Troguery, La Roche Derrien, France, 22450

[21] Appl. No.: 208,684

[22] Filed: Nov. 20, 1980

[30] Foreign Application Priority Data

Nov. 22, 1979 [FR] France .................. 79 28850

[51] Int. Cl.³ .................. G02B 5/16; G02B 5/172
[52] U.S. Cl. .................. 350/96.23; 350/96.24
[58] Field of Search .................. 350/96.23, 96.24; 250/227

[56] References Cited

U.S. PATENT DOCUMENTS

| 4,054,365 | 10/1977 | Marx et al. | 350/96.23 |
| 4,154,049 | 5/1979 | King et al. | 350/96.23 |
| 4,199,224 | 4/1970 | Oestrich | 350/96.23 |

FOREIGN PATENT DOCUMENTS

| 2288318 | 5/1976 | France . |
| 2401434 | 3/1979 | France . |
| 2001777 | 2/1979 | United Kingdom . |
| 2017967 | 10/1979 | United Kingdom | 350/96.23 |
| 2021282 | 11/1979 | United Kingdom . |

OTHER PUBLICATIONS

Gleason et al–"Design and Manufacture of an Experimental Lightguide Cable for Undersea Transmission System," Proceedings of the 27 International Wire and Cable Symposium, Cherry Hill, New York, U.S.A., 14–16, Nov. 1978; pp. 385–389.

*Primary Examiner*—Marvin L. Nussbaum
*Attorney, Agent, or Firm*—Lowe, King, Price & Becker

[57] ABSTRACT

The cable consists of a central core including helical grooves at its periphery and a composite sheath. Each groove receives at least one optical fibre. To obviate any distortion near the optical fibres as a result of cable laying and of high isostatic pressures in operation of the order of 8 daN/mm², the center of the core is constituted by a strand of metal wires and by a metal grooved jacket therearound. The sheath comprises a metal inner jacket which closes the grooves but does not press on the fibres, an insulating jacket, a second metal jacket and an outer insulating jacket.

27 Claims, 6 Drawing Figures

OPTICAL FIBRE SUBMARINE CABLE

BACKGROUND OF THE INVENTION

1. Field of the Invention

This invention relates to an optical fibre cable of use inter alia for submarine transmission systems. It comprises a cylindrical core member having a periphery with continuous helical grooves, each receiving at least one optical fibre and a composite tubular sheath having a first inner jacket closing the grooves.

2. Description of the Prior Art

Optical fibre submarine cables of this kind are disclosed e.g. by French Patent Application No. 2,401,434, United Kingdom Patent Applications Nos. 2,001,777 A; 2,107,967 A and 2,021,282 A and by an article by F. F. Gleason, R. C. Mondello, B. W. Fellows and D. A. Hadfield entitled: "Design and manufacture of an experimental lightguide cable for undersea transmission system" published in the Proceedings of the 27th International Wire and Cable Symposium, Cherry Hill, New-York, U.S.A., 14–16 November 1978, pages 385 to 389.

As a rule a submarine optical fibre cable core member takes the form of a rod which can be metal, e.g. copper, or extruded plastics. The periphery of the core member can be formed with helical grooves each of which contains one or more optical fibres; alternatively the core member can be embodied by V-shaped folded splicing tapes of polyester or aluminium which are welded together to make up a circular transverse cross-section and each of which contains one or more optical fibres; or else the central member can be embodied by a steel wire around which optical fibres are completely encapsulated in an elastomeric buffer which is sheathed with a fine layer of nylon by means of a tubing extrusion operation. A composite sheath for the core comprises, in addition to a plastic outer insulating jacket around a first metal jacket, an inner protective strength tube. This strength tube is lodged inside the last-mentioned two jackets and is embodied by a plurality of layers of steel wires which are stranded around the central core member.

Since the strength tube extends around the central core member and is therefore of greater diameter than the latter, the resulting cable is relatively bulky and heavy per unit length, with a consequent limitation in the number of optical fibres, i.e. in cable capacity.

All of these known kinds of cable have the main disadvantage of causing the optical fibres to experience substantial and uncontrolled stresses, for the high underwater pressures, of the order of some 6 to 8 daN/mm$^2$, make it difficult to give credence to the idea of a "strength" tube formed by wires or cables serving for remote feeding of the transmission system repeaters. The strength tube is also required to have very high tensible strength and is correspondingly embodied by strands of high-strength steel—a very expensive form of tube construction. The non-uniformity of such an assembly and the possible deformations lead to very severe stresses being imposed on all the optical fibres during manufacture of the tube and during the laying and operation of the cable. The carrying portion of the cable in the form of the stranded wires around the central member is bound to become distorted at least during cable laying. Measurements made on optical fibre transmission cables of this kind show that the fibres are very sensitive to such effects, which include greatly increased attenuation and, in the fairly long term, a risk of fibres rupturing.

Also, since the strength tube extends around the optical fibres, the diameter of the central core member, and therefore the number of optical fibres, has to be limited. This consideration also impedes connection of the cable to the repeaters and repair of the cable in the event of the optical fibre breaking. Also, the internal arrangement even of the elements included in the cable does not make for ready manufacture of long cable runs, since the operations of forcing on the strength tube and of multistage sheathing or extrusion encapsulating around the central core member supporting the optical fibres may cause breakings thereof. Welding and storage operations for the butting together of unit cables are also difficult matters.

With a view mainly to obviating the disadvantages of the protective strength tube around the central core containing the optical fibres, U.S. Pat. No. 4,199,224 uses as a cable-strengthening element a central core member having a center embodied by a plurality of layers of steel wires similarly to the core of conventional coaxial submarine cables. The central strand of steel wires is surrounded by a radial system which comprises chambers and which is an extruded plastic section member having a cross-section the shape of a spoked wheel. Each chamber extends helically around the central steel strand, is open radially towards the exterior and receives at least one optical fibre.

The composite tubular cable sheath in accordance with the U.S. Pat. No. 4,199,224 has, as inner jacket extending around and closing the chambers or compartment, a composite crepe paper and/or plastic. The material used for this inner jacket, the presence of the chamber system and the structure thereof make it impossible for a cable of this kind to be used as a submarine cable, for the following reasons.

First, the high submarine pressures acting on such a cable would crush the plastics chamber system. The height and width of a transverse cross-section of chambers of this cable are typically 6 mm and 5 mm and the chambers are spaced apart from one another by radial ribs which are 6 mm high and only 2 mm thick. Second, the damage would be aggravated because the inner jacket of the composite sheath is of the order of 1 mm thick and is made of plastic. The compression strength of this jacket is at least of the order of 11 daN/mm$^2$, a result achieved by using a high compression strength material, such as loaded polystrene. Each rib must therefore withstand an underwater pressure of from 6 to 8 daN/mm$^2$ over approximately 7 mm of a cylindrical sector of the inner jacket, i.e. the compression strength of each 2 mm thick rib must be approximately $(6 \times 7)/2 = 24$ daN/mm$^2$ to $(8 \times 7)/2 = 28$ daN/mm$^2$, very much more than 11 daN/mm$^2$.

Also, the chambers of the radial system are completely full of a non-freezing substance which surrounds the optical fibres. The sheath inner jacket is therefore in direct contact with such substance and compression thereof therefore helps to crush and damage the optical fibres.

In a variant of U.S. Pat. No. 4,199,224, a layer of electrical conductors for remote feeding of the transmission system repeaters is provided between the two tubular elements forming the composite inner jacket of the cable sheath. This single layer of conductors is not a strength tube for underwater cables in the sense hereinbefore defined and would also help to crush the radial chamber system if the cable were used underwater.

OBJECT OF THE INVENTION

The main object of this invention is to provide an optical fibre cable in which the materials forming the grooved jacket of the central core member and the inner jacket of the composite sheath closing the grooves can withstand high submarine pressure without deformation although the centre of the core member consists of a reinforcing element such as strandard steel wires. In other words, locating the strengthening element at the centre of the cable obviates the difficulties in assembling and repairing submarine cables of the kind previously described, since to gain access to the optical fibres or lay them in the grooves, all that needs to be done is to remove the relatively light and easy-to-handle composite sheath. Also, during cable manufacture the central cable core member is embodied independently of the presence of the optical fibres.

SUMMARY OF THE INVENTION

In accordance with the invention, an optical fibre cable comprises a central core member embodied centrally by a strand of metal wires and by a tubular jacket extending therearound and formed on its periphery with continuous helical grooves each receiving at least one optical fibre; and a composite tubular sheath having a first inner jacket extending around the core member and closing the grooves therein. The cable embodying the invention is characterized in that the grooved jacket of the core member and the inner first jacket of the composite sheath are metallic.

The optical fibres are protected solely by a fine coating a few microns thick applied to the fibre units, are received in the grooves of the jacket of the central core member. A gel, grease, powder, expanding agent or the like fills, the grooves to some extent. This partial filling in the lower part of the grooves has the advantage of obviating the transmission of the isostatic pressure to the optical fibres contained in the grooves. Since the fibre supporting grooved jacket is separate from the core of the central member, such core being formed by the carrier of the stranded wire cable, and since the grooved jacket is thin, there is no risk of the fibres being deformed during cable laying.

Possible distortions near the fibres can occur only in the jacket parts between adjacent grooves. In another embodiment, matters are improved still further by the grooved jacket of the central member being embodied by the juxtaposition of cylindrical sectors around the central strand. Deformation of the central carrier therefore has no effect on the optical fibres. Also, it is easy to repair a broken cable by replacing the jacket of the central member or sectors which make up such a jacket.

Since the steel wire strand which gives the cable tensile strength is at the centre of the core, the cable in accordance with the invention facilitates connections to cable lengths and repeaters and has increased optical fibre capacity.

In accordance with another feature of the invention, a composite sheath comprises coaxial structure including a first tubular insulating jacket around the inner jacket, a second tubular metal jacket around the first insulating jacket and a second tubular insulating jacket around the second metal jacket. The first jackets around which the second jackets of the sheath extend improve sealing tightness of the cable while protecting the optical fibres from isostatic pressure, since the first metal jacket extends around all the optical fibres but does not contact the same directly. This inner jacket preferably consists of strip material in alloy form having a high content of aluminium or steel. The double water protection minimizes a risk of impairing of the optical and mechanical properties of the optical fibres in the case of damage to the cable but does not require the presence of thick sheathing, usually produced by extrusion, around each fibre. It is known that this thick sheating around the fibres of the prior art cables is the main obstacle to satisfactory behaviour of the fibre in response to the isostatic pressure.

The following further advantages of the cable in accordance with the invention are worth mentioning.

In a given model, the umber of fibres can vary in accordance with the filling percentages possible for the grooves in the metal jacket around the central core. The number of grooves can be modified by changing the continuous machine tool equipment used to machine the jacket of the central core and thus to increase or decrease cable capacity as required.

Long lengths of cable can be produced because of the continuous grooving in the jacket around the core and, where applicable, because of continuous assembly by rolling in a rolling mill or by extrusion of the core-forming cylindrical sectors, using techniques, similar to those already used for coaxial submarine cables. Butt-welding of elementary cable lengths causes a brief interruption in fibre laying, a job which is also performed continuously by means of sheets of fibre delivered by a fibring machine, the capacity of which is, as a rule, greater than the plasticizing machines which form the cable.

The final outer diameter of the cable depends mainly upon the final outer diameter of the central carrying strand. The sheath thickness, i.e. particularly the thickness of the first and second insulating jackets, depends only upon criteria relating to the remote feeding of the repeaters. Remote feeding of current and remote monitoring signals for the repeaters are transmitted at least by way of the core jacket formed with the grooves.

BRIEF DESCRIPTION OF THE DRAWING

Other advantages of the invention will be apparent from the following more particular description of preferred embodiments of the invention as illustrated in the accompanying drawings, in which.

DESCRIPTION OF THE PREFERRED EMBODIMENTS

Figure 1:
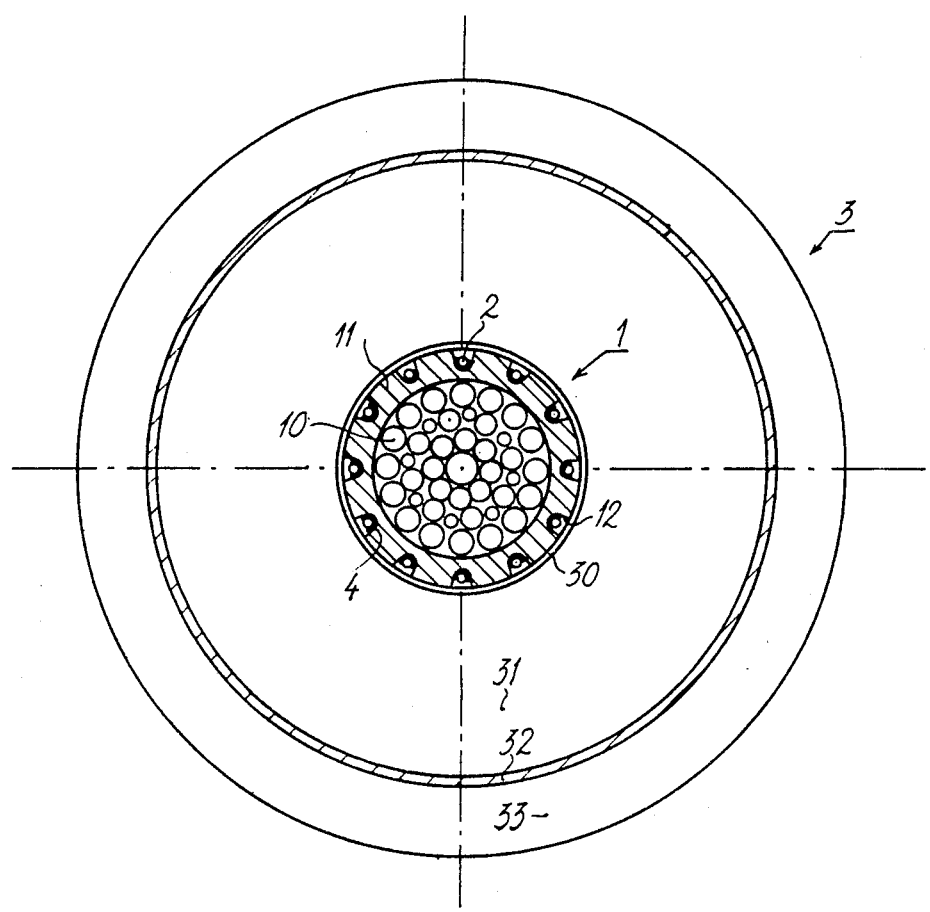
FIG. 1 is a transverse cross-sectional view of an optical fibre cable embodying the invention.

Referring to FIG. 1, an optical fibre cable embodying the invention comprises a centre, central member or core 1 containing optical fibres 2 and a peripheral composite sheath 3 surrounding the core 1. Each optical fibre 2 has individual protection in the form of a thin film, such as an epoxy acrylate or epoxy layer applied to the fibring of the optical fibres. Each optical fibre typically has an outer diameter of the order of 150 μm.

At the center of the central core 1 is a strand of helically wound steel wires 10 which is surrounded by a metal jacket 11, preferably of steel or alloy containing a high proportion of aluminium or copper. The stranded steel wires 10 are high-strength elements similar to those forming part of the central core of known coaxial submarine cables. The cross-sections of the wires 10 may vary, as shown in FIG. 1. The wires 10 are arranged as a contact circular strand and are therefore substantially incapable of being deformed by underwater pressure.

Figure 2:
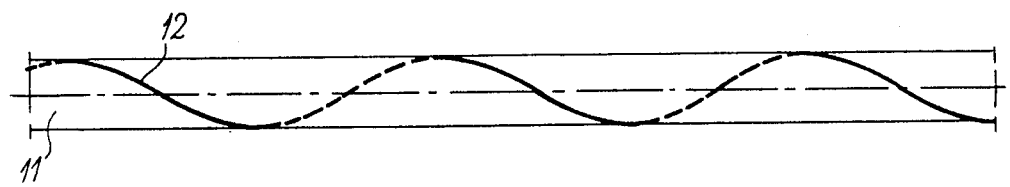
FIGS. 2 and 3 are schematic longitudinal views of the cable core and two kinds of paths for the grooves in the outer jacket of the core.
Figure 3:
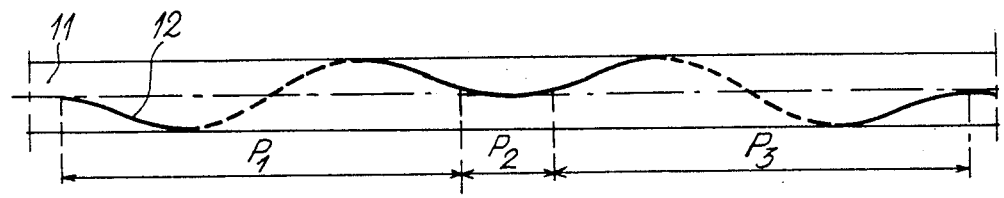

In cross-section, the periphery of jacket 11 is formed with a plurality of evenly spaced-apart slots 12 which extend over the whole length of the cable as helical grooves adapted to receive without tension the fibres 2, in the case shown in the proportion of one fibre per groove. Each groove 12 can be provided to receive more than one fibre. Each groove 12 can extend as a continuous helix having a pitch which can be very large relatively to the diameter of the core 1, as shown in FIG. 2; alternately, the groove 12 can, as shown in FIG. 3, extend along a path in which a helical portion $P_1$ with a right-hand pitch is followed by a transition portion $P_2$, the same being followed by a helical portion $P_3$ with a left-hand pitch, and so on. The second embodiment has the advantage over the first embodiment of obviating the step of untwisting the fibres when they are laid in the grooves, thus obviating the risk of overlapping of fibres.

Figure 4:
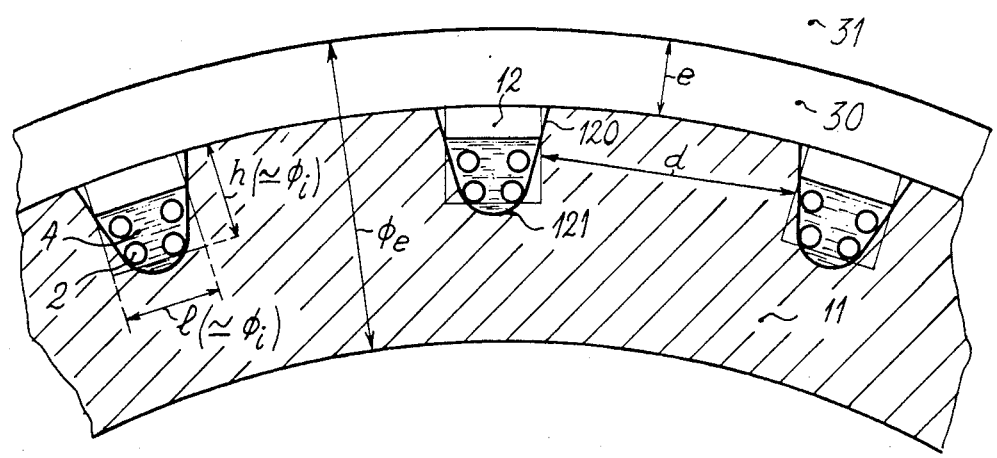
FIG. 4 is a transverse cross-sectional view to a large scale of one portion of the inner jacket of the composite sheath extending around and closing the core grooves.

As shown in FIG. 1 and in detail in FIG. 4, simultaneously with the fibres 2 being laid in the grooves 12, the fibres can be partly filled by a product 4 such as a silicone grease or any other grease or gel or expanding agent adapted to seal the cable and adapted to reduce contact and vibration between the fibres and the groove walls 120, 121.

The product 4 fills the lower part of the grooves 12 and retains the optical fibres 2 therein, so that neither the product 4 nor the optical fibres are in contact with inner jacket 30 of the composite sheath. The optical fibres are therefore kept free of any stresses received directly by the jacket 30.

The jacket 11 also facilitates the production, e.g. by machining, of the fibre-receiving grooves 12. Also, the metal jacket 11, acting as a conductor, serves for remote feeding and remote monitoring of the transmission repeaters of the cable link.

Protective jacket 11 also provides sufficient compressional strength for the solid part between two adjacent grooves 12, so as not to be crushed at the high pressure found underwater; this feature is described hereinafter. The solid parts between adjacent grooves have the width d in FIG. 4.

According to the embodiment shown in FIG. 1, the jacket 11 is produced e.g. by being extruded around the central carrying strand 10 or by being rolled and welded in a conventional manner in the cable-making art. In the latter case, cold forming in a dye or by rollers anchors the jacket 11 satisfactorily to the central carrying strand 10 and obviates possible distortions of the jacket 11.

Referring to FIG. 1, the composite sheet 3 is tubular and comprises coaxially of the core 1 and disposed starting therefrom in the following order a first inner metal jacket 30, a first insulating jacket 31, a second metal jacket 32 and a second insulating jacket 33 which constitutes the outer jacket of the composite sheath. All of these jackets are tubular and each has an outside diameter substantially the same as the internal diameter of the immediately following jacket.

The jacket 30 is made of a metal strip, preferably of steel or alloy containing a high proportion of copper or aluminium. It is adapted to close the fibre receiving grooves 12 and to prevent compression and shear deformations of the first insulating jacket 31, the latter being made of a plastics such as a polyethylene. Also, since the product 4 only partly fills the grooves 12, i.e. the lower parts thereof, but does not contact the jacket 30, the jacket 30 overhangs the fibres 2 and obviates any transmission thereto of the isostatic pressure. The first inner insulating jacket 31 can experience high pressures and severe deformations, inter alia near the ridges formed by the periphery of the grooved jacket 11 and the groove walls 120. The thickness of the jacket 30, dependent upon the nature of the materials used, is in any case slight—a few tenths of a millimeter—thus obviating distortions and safeguarding the fibres 2, as seen hereinafter.

The first insulating jacket 31 is surrounded by the second metal jacket 32 which is in turn surrounded by the outer insulating jacket 33. The outer jacket 33 is preferably made of polyethylene, as in the case of coaxial submarine cables. The jacket 33 protects the cable against abrasion arising from possible rubbing contact between the cable and rocks on the sea bed and against various forms of physiochemical aggression which occur during laying and operation. The jacket 33 also has a coefficient of friction compatible with the conventional materials used for cable laying. This outside part of the cable may have various appearances according to whether the cable is being used near the coast or in shallow water or at medium depth. Inter alia outside reinforcements for protection against trawls, anchors and dredgers are necessary and are familiar in the submarine cable art.

As previously stated, the main item keeping pressure away from the optical fibres is the outer jacket 11 of the central core 1 and the inner jacket 30 of the composite sheath 3. Referring to FIG. 4, each groove section 12 closed by the jacket 30 is assumed to be a long tube having an internal diameter $\phi_i$ equal to groove width 1. In practice, this width is substantially equal to groove height h. The tube which represents the groove therefore consists partly of side 120 and base 121 of the groove and partly of the inner jacket 30 of the composite sheath 3.

Using this approximation it becomes possible to apply the formula of D. BOULIAU which states the thickness e in mm of a tube in dependence upon the pressure p in daN/mm² acting on the tube wall as:

$$e = p\phi_i/(2T - 1.14p)$$

in which T denotes the work rate of the metal in tension and is expressed in kg/mm².

According to formula (1), the minimum-strength metal which can be used is such that:

$$2T - 1.14p \geq 1$$

When the pressure is equal to the required maximum pressure of 8 daN/mm², the tension work rate is T≧5.06. Alloys or metals having a coefficient T greater than 5.06 are, for instance, mild, half-hard and nickel-alloy steels and alloys having a high aluminium or copper content. For the minimum value of T=5.06, the thickness e=p $\phi_i$ is relatively large for a pressure p=8 daN/mm²; for instance, when $\phi_i$=1 mm, e=8 mm. If the optical fibres are received in grooves or chambers having sides or ribs which are thin relative to groove width in accordance with the U.S. Pat. No. 4,199,224, or are encapsulated within an elastomeric buffer in accordance with the article of F. F. Gleason et al, formula (1) must be applied to the tube consisting solely of the inner jacket of the composite sheath. Thus, when $\phi_i$=17 mm, then e=136 mm and when $\phi_i$=5 mm, then e=40 mm. In contrast to French Patent Application 2,288,318, this first approximation shows the need for the grooves 12 to be of very narrow section, i.e. the need to devise a jacket 11 having narrow grooves spaced relatively far apart from one another (distanced, FIG. 4) and having a very strengthened inner jacket 30.

Also, tube stresses must be relatively small unless the tube is to be deformed by high pressures. The direct peripheral stressing of the tube inner wall is given by the following formula:

$$\sigma_i = \frac{2p\ \phi_e^2}{\phi_e^2 - \phi_i^2} \quad (2)$$

in which $\phi_e$ denotes tube outer diameter. Consequently, with an inner diameter $\phi_i$=0.8 mm and a thickness e=0.8 mm, i.e. an outer diameter $\phi_e$=2.4 mm, the above formula (2) gives when p=8 daN/mm²:

$\sigma_i$=18 daN/mm².

This stress is relatively small compared with the stress on the inner tubular jacket of the composite sheath in accordance with U.S. Pat. No. 4,199,224, which can be as much as 80 daN/mm² when $\phi_i$=17 mm, $\phi_e$=19 mm and e=2 mm.

If the wall of the long tube is thin and experiences compression, the tube becomes unstable and its circular cross-section tends to become first elliptical and then to collapse completely. The smallest value of critical pressure then becomes:

$p_{cr} = 16\ Ee^3/((1-\mu^2)(\phi_e+\phi_i)^3)$ in which E denotes the elasticity modulus of the tube material at ambient temperature and $\mu$ denotes the coefficient of lateral shrinkage. This critical pressure $p_{cr}$ must be above 8 daN/mm², something which does not occur in the cable disclosed by U.S. Pat. No. 4,199,224.

In accordance with the invention, measurements made on the following experimental constructions showed that the jackets 11 and 30 could withstand a compression of at least 8 daN/mm² without distortion. These jackets were made of A5 to A9 aluminium alloy (99.5% to 99.9% aluminium) or of various kinds of Duralinax or of rolled half-hard or hard steel or of a copper containing alloy. The average height h and average width l of the substantially rectangular section grooves were less than 2 mm, preferably 0.8 mm. The distance d between two approximal walls of two adjacent grooves was greater than 2 mm and the thickness of the grooved jacket 11 was at least 4 mm. The thickness e of the outer jacket 30 was equal to or more than 0.50 mm.

By way of example the dimensions of the various cable components are as follows:

|  | Outer diameter (mm) | Thickness (mm) |
| --- | --- | --- |
| Strand 10 | 20 | — |
| Grooved jacket 11 | 40.5 | 5.75 |
| Outer metal jacket 30 | 44 | 1.75 |
| Insulating jacket 31 | 102.5 | 29.25 |
| Metal jacket 32 | 108 | 2.75 |
| Insulating jacket 33 | 130 | 11 |

Figure 5:
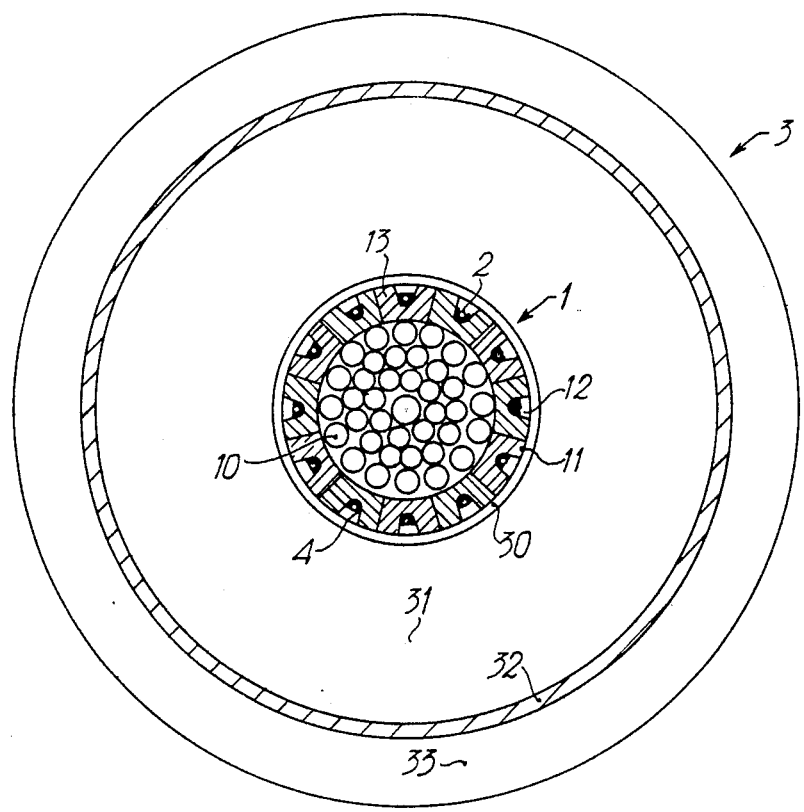
FIG. 5 is a transverse cross-sectional view of a cable in accordance with another embodiment of the invention.

FIG. 5 is an illustration of another embodiment of the cable in accordance with the invention, the difference residing in the construction of the grooved jacket for the central core. In this case, the grooved jacket 11 is formed by the juxtaposition of segments 13 the cross-sections of which are cylindrical sectors and which extend helically around the central strand 10. Preferably, segments 13 are made of one of the aluminium alloys or one of the steels previously mentioned for the continuous jacket 11 of FIG. 1. Segments 13 are produced by rolling in a mill or extrusion, thus facilitating the production of grooves of excellent shape and surface texture with good dimensional control. Each segment 13 can include one or more equidistributed helical grooves 12 on its inner periphery. The segments 13 are assembled together to form the outer jacket 11 of the core 1 around the central strand 10 by known means such as by sticking of the radial edges 130 thereof and/or by nesting or tonguing and grooving. In the tongue and groove embodiment shown in FIG. 6, the radial edge 130 of one of the two adjacent segments has a tongue 131 which engages in a matching groove 132 of the proximal radial edge 130 of the other of the two adjacent segments. The assembly can have a contained dovetail and a containing dovetail, in which event the segments slide relatively to one another during assembly. However, the segments 13 can be secured to one another in a known manner by screws and plates on the outer peripheries thereof and at the ends thereof, the screws and plates being introduced into corresponding recesses.

Figure 6:
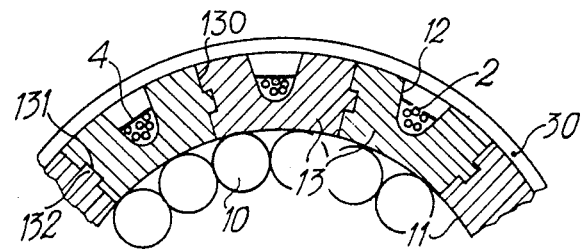
FIG. 6 is a transverse cross-sectional view in detail of the cylindrical sectorial members of the jacket of the central core of the cable of FIG. 5.

FIG. 6 is a view of the embodiment previously referred to in which each groove 12 receives a plurality of optical fibres 2—in the present case, at least five fibres for a high-capacity cable. As previously stated, the gel or grease or the like 4 partly fills the grooves 12 but does not contact the inner jacket 30 of the composite sheath 3 and retains the fibres 2 at the bottom of the grooves. Although FIG. 6 relates to the segment jacket 11 of FIG. 5 each groove of a cable of the kind shown in FIG. 1 can also receive a plurality of fibres.

Conveniently, the optical fibres are such that the very long part received in the grooves is longer than the grooves, i.e. the optical fibres extend sinuously in the grooves. This ensures that the optical fibres are not pulled during laying and operation of the cable.

What we claim is:
1. An optical fibre cable comprising:
   a central member including a central strand of metal wires and a tubular grooved jacket,
   said grooved jacket including juxtapositioned cylindrical cross-section segments surrounding said metal wire strand, each of said cylindrical segments having an outer periphery including one or more helicoidal grooves, each receiving at least one optical fibre; and a tubular sheath having a jacket surrounding said central member and closing said grooves of said grooved jacket, said grooved jacket and said jacket surrounding said central member being metallic.

2. An optical fibre cable according to claim 1 wherein said cylindrical segments are extruded.

3. An optical fibre cable according to claim 1 or 2 wherein said cylindrical segments are secured to each other by an assembly of tongues and grooves in radial edges of the segments.

4. An optical fibre cable according to claim 1 wherein said cylindrical segments are rolled.

5. An optical fibre cable according to claim 1 or 2 wherein said cylindrical segments are stuck to each other.

6. An optical fibre cable adapted to be used underwater comprising:
a central member including a central strand of metal wires and a tubular grooved jacket surrounding said strand, said jacket including peripheral helical grooves each receiving at least one optical fibre;
a tubular sheath having a jacket surrounding said central member and closing said grooves of said grooved jacket;
said grooved jacket and said jacket surrounding said central member being metallic; and
an agent for substantially preventing the transmission of isostatic pressure to the optical fibres, the agent filling the bottom of said grooves so the agent does not contact said first inner jacket of said sheath while retaining said optical fibres on said bottom of said grooves, said first inner jacket applying no pressure to said optical fibres.

7. An optical fibre cable comprising:
a central member including a central strand of metal wires and a tubular grooved jacket surrounding said strand, said jacket including peripheral helical grooves each receiving at least one optical fibre;
a composite tubular sheath including: a first inner jacket surrounding said central member and closing said grooves of said grooved jacket, a first tubular insulating jacket surrounding said first inner jacket, a second tubular metal jacket surrounding said first insulating jacket, and a second tubular insulating jacket surrounding said second metal jacket, each of said jackets being coaxial with each other.

8. An optical fibre cable according to claim 6 or 7 wherein said grooved jacket is extruded.

9. An optical fibre cable according to claim 6 or 7 wherein said grooved jacket is rolled and welded around said metal wire strand of said central member.

10. An optical fibre cable according to claim 6 or 7 wherein said grooves in said grooved jacket of the central member are machined.

11. An optical fibre cable according to claim 6 or 7 wherein said grooved jacket is made of an alloy selected from the group consisting of a high aluminium and copper content, a high aluminium content, steel or Duralinox.

12. An optical fibre cable according to claim 6 or 7 wherein the average width of grooves in said grooved jacket is less than 2 mm.

13. An optical fibre cable according to claim 12 wherein said grooved jacket is made of an alloy selected from the group consisting of a high aluminium and copper content, a high aluminium content, a high aluminium and copper content, or Duralinox.

14. The cable of claim 6 or 7 wherein the distance between proximal walls of two adjacent grooves in said grooved jacket is more than 2 mm.

15. The cable of claim 11 wherein the distance between proximal walls of two adjacent grooves in said grooved jacket is more than 2 mm.

16. An optical fibre cable according to claim 6 or 7 wherein the thickness of said grooved jacket is more than 4 mm.

17. An optical fibre cable according to claim 11 wherein the thickness of said grooved jacket is more than 4 mm.

18. An optical fibre cable according to claim 7 wherein the critical pressure of said first inner jacket of said sheath is greater than 8 daN/mm$^2$.

19. An optical fibre cable according to claim 11 wherein the critical pressure of said first inner jacket of said sheath is greater than 8 daN/mm$^2$.

20. An optical fibre cable according to claim 7 wherein said first inner jacket of said composite sheath is made of an alloy selected from the group consisting of a high aluminium and copper content, a high aluminium content, steel or Duralinox.

21. An optical fibre cable according to claim 7 wherein the thickness of said first inner jacket of said sheath is at least equal to 0.5 mm.

22. An optical fibre cable according to claim 20 wherein the thickness of said first inner jacket of said sheath is at least equal to 0.5 mm.

23. An optical fibre cable according to claim 7 wherein said insulating jackets are plastic.

24. An optical fibre cable according to claim 7 wherein said insulating jacket are polyethylene.

25. An optical fibre cable according to claim 6 or 7 wherein each of said grooves comprises in seriatim a helical portion with a right-hand pitch, a transition portion and a helical portion with a left-hand pitch and so on, each of said fibres extending substantially through the length of a groove associated with the fibre.

26. An optical fibre cable according to claim 6 or 7 wherein a part of the optical fibres is received in said grooves so it follows a sinous path and is longer than said grooves.

27. An optical fibre cable comprising:
a central member including a central strand of metal wires and a tubular grooved jacket surrounding said strand, said jacket including peripheral helical grooves each receiving at least one optical fibre, each of said grooves comprising in seriatim a helical portion with a right-hand pitch, a transition portion and a helical portion with a left-hand pitch and so on, each of said fibres extending substantially through the length of a groove associated with the fibre;
a tubular sheath having a jacket surrounding said central member and closing said grooves of said grooved jacket;
said grooved jacket and said jacket surrounding said central member being metallic.

* * * * *